(12) United States Patent
Perlman

(10) Patent No.: US 7,891,619 B2
(45) Date of Patent: Feb. 22, 2011

(54) TELESCOPING CLAMP ASSEMBLY

(75) Inventor: Maurice Perlman, Oak Park, MI (US)

(73) Assignee: Delaware Capital Formation, Inc., Wilmington, DE (US)

( * ) Notice: Subject to any disclaimer, the term of this patent is extended or adjusted under 35 U.S.C. 154(b) by 2 days.

(21) Appl. No.: 12/117,223

(22) Filed: May 8, 2008

(65) Prior Publication Data

US 2008/0283703 A1 Nov. 20, 2008

Related U.S. Application Data

(60) Provisional application No. 60/917,786, filed on May 14, 2007.

(51) Int. Cl.
*F16B 1/00* (2006.01)
(52) U.S. Cl. ............... 248/229.14; 248/230.1; 248/230.5; 248/298.1
(58) Field of Classification Search ............ 248/229.14, 248/229.2, 229.24, 229.1, 227.4, 227.3, 230.1, 248/230.5, 231.61, 298.1
See application file for complete search history.

(56) References Cited

U.S. PATENT DOCUMENTS

| | | | | |
|---|---|---|---|---|
| 2,019,789 A | * | 11/1935 | Mahannah | 269/71 |
| 3,173,644 A | * | 3/1965 | Burfiend | 248/354.6 |
| 4,458,870 A | * | 7/1984 | Duncan et al. | 248/279.1 |
| 4,576,501 A | | 3/1986 | McConnell | |
| 4,650,427 A | * | 3/1987 | Huchinson | 440/55 |
| 5,275,600 A | * | 1/1994 | Allard et al. | 606/252 |
| 5,482,239 A | * | 1/1996 | Smith | 248/229.13 |
| 6,110,173 A | * | 8/2000 | Thomas, Jr. | 606/252 |
| 6,176,640 B1 | | 1/2001 | Gonczi | |
| 6,220,556 B1 | * | 4/2001 | Sohrt et al. | 248/279.1 |
| 2006/0228205 A1 | | 10/2006 | Trachet et al. | |
| 2008/0169405 A1 | * | 7/2008 | Chen | 248/354.3 |

FOREIGN PATENT DOCUMENTS

DE 20 2007 001 718 8/2007
GB 2 364 739 2/2002

* cited by examiner

*Primary Examiner*—Anita M King
(74) *Attorney, Agent, or Firm*—Harness, Dickey & Pierce, P.L.C.

(57) ABSTRACT

A telescoping clamp assembly for a material handling system includes an inner shaft, an outer shaft, a clamping device, and a retaining element. The inner shaft has a longitudinal guide portion along an outer surface of the inner shaft. The outer shaft has a bore adapted to receive the inner shaft. The clamping device is located at the outer shaft and is configured to tighten the outer shaft about the inner shaft. The retaining element is adjustable to adjust a degree of clamping of the clamping collar at the outer shaft. The retaining element also engages the longitudinal guide portion of the inner shaft to limit extension and/or extraction of the inner shaft from the outer shaft.

12 Claims, 4 Drawing Sheets

TELESCOPING CLAMP ASSEMBLY

CROSS-REFERENCE TO RELATED APPLICATION

This application claims the benefit of U.S. Provisional Application No. 60/917,786, filed on May 14, 2007. The disclosure of the above application is incorporated herein by reference.

FIELD

The present disclosure relates generally to material handling systems and, more particularly, to an adjustable clamp for clamping or mounting devices to a support structure of a material handling system.

BACKGROUND

Automated material handling systems, such as robotic arms, are typically used to move objects within and/or between manufacturing stages in a manufacturing process. Typical objects that may be moved during a manufacturing process or between manufacturing processes include, for example, glass windows, sheet metal stampings, separate components to be welded, bolted, or otherwise attached to one another, or subassemblies that are to be connected to a larger assembly. For adaptability and reconfigurability of the system, it may be desirable to provide an adjustable clamp assembly between the material handling equipment and the object to be handled.

Typical adjustable clamp assemblies may include a telescoping shaft slidably received within a tube. The shaft includes an expandable shaft portion and an axial bolt that is rotatable to expand the expandable portion into engagement and frictional contact with an inner surface of the tube at a selected position or degree of extension of the shaft relative to the tube. The overall length of the telescoping clamp assembly is thus adjustable and reconfigurable according to the particular needs of the object handling system. The bolt that is used to secure the shaft relative to the tube also typically holds an end clamp on the telescoping clamp assembly tight around a spherical ball or cylindrical shaft that is part of the material handling system. Thus, loosening or adjusting the bolt, such as to loosen or adjust the end clamp, also loosens the telescoping shaft and may lead to unintentional disassembly of the clamp assembly.

SUMMARY

The present disclosure provides a telescoping clamp assembly for a material handling system. The telescoping clamp assembly is extendable and retractable so that the length of the telescoping clamp assembly may be customized or adjusted or reconfigured for a given application. Further, the telescoping clamp assembly of the present disclosure may limit or substantially preclude inadvertent separation of the telescoping shaft from the tube when a clamp is loosened, and allows for loosening and adjusting of the telescoping shaft relative to the tube while one or both end clamps remain tightened or secured about the material handling system devices or components or support structure.

According to an aspect of the present disclosure, a telescoping clamp assembly for a material handling system includes an inner shaft, an outer shaft, a clamping device, and a retaining element. The inner shaft has a longitudinal guide portion along an outer surface of the inner shaft. The outer shaft has a bore adapted to receive the inner shaft. The clamping device is located at the outer shaft and is configured to tighten the outer shaft about the inner shaft. The retaining element is adjustable to adjust a degree of clamping of the clamping collar at the outer shaft. The retaining element also engages the longitudinal guide portion of the inner shaft to limit extension and/or extraction of the inner shaft from the outer shaft.

The inner shaft may comprise a substantially cylindrical rod, and the longitudinal guide portion may comprise a recess or a flat or generally flat or planar region at least partially along the inner shaft. The clamping device may be unitarily formed with the outer shaft or may comprise a separate component at or around the outer shaft. Optionally, the clamping device may include a threaded bore, and the retaining element may comprise a threaded fastener for threadably engaging the threaded bore to tighten the outer shaft around the inner shaft.

The telescoping clamping assembly may further comprise a first clamp at an end of the inner shaft and a second clamp at an end of the outer shaft. The first clamp may be coupled to the inner shaft by a first threaded fastener, and the second clamp may be coupled to the outer shaft by a second threaded fastener. The first clamp and the second clamp may be adjustable to clamp and release about a support rod or material handling component irrespective of the degree of clamping of the clamping device about the outer shaft and/or inner shaft.

Therefore, the present disclosure provides a telescoping clamp assembly that allows a user to adjust the length of the telescoping clamp assembly without inadvertently separating the inner shaft from the outer shaft. For example, the retaining element may be a threaded fastener, such as a bolt, and the bolt may be loosened in the clamping device to loosen the inner shaft in the bore of the outer shaft, and may engage an end of the longitudinal guide portion or recess to limit or substantially preclude complete extension of the inner shaft from the outer shaft. If disassembly is desired, the retaining element may be at least partially removed from the clamping device so as to be removed from or disengaged from the guide portion or recess. Further, end clamps at either end of the telescoping clamp assembly may be tightened and loosened independently of the tightness of the inner shaft in the bore of the outer shaft.

These and other objects, advantages, purposes and features of the present disclosure will become apparent upon review of the following description in conjunction with the drawings.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1A:
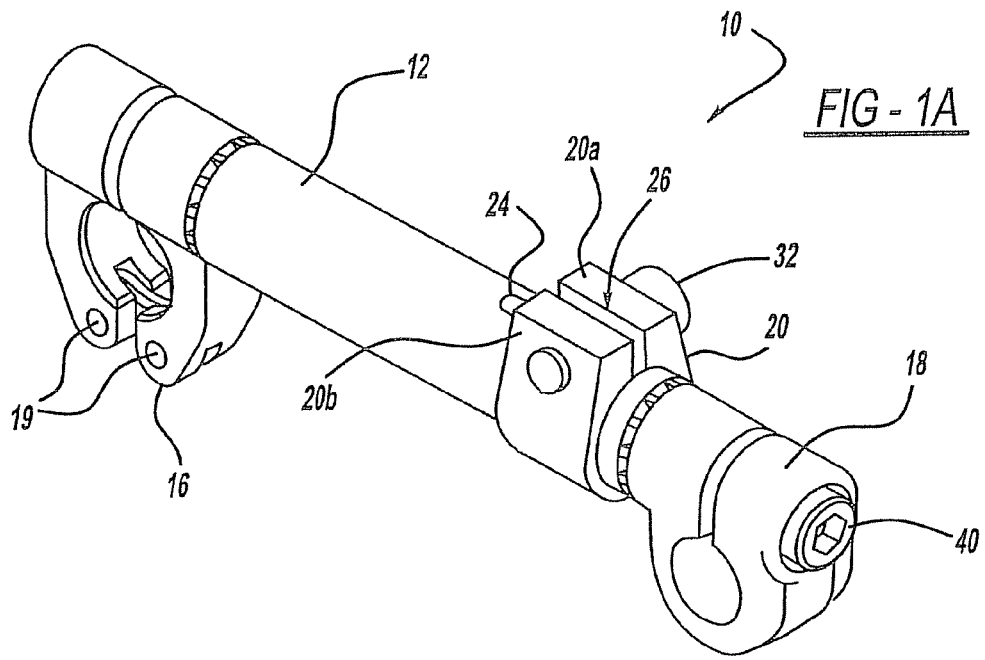
FIG. 1A is a perspective view of a telescoping clamp assembly with the telescoping shaft in a retracted position.
Figure 1B:
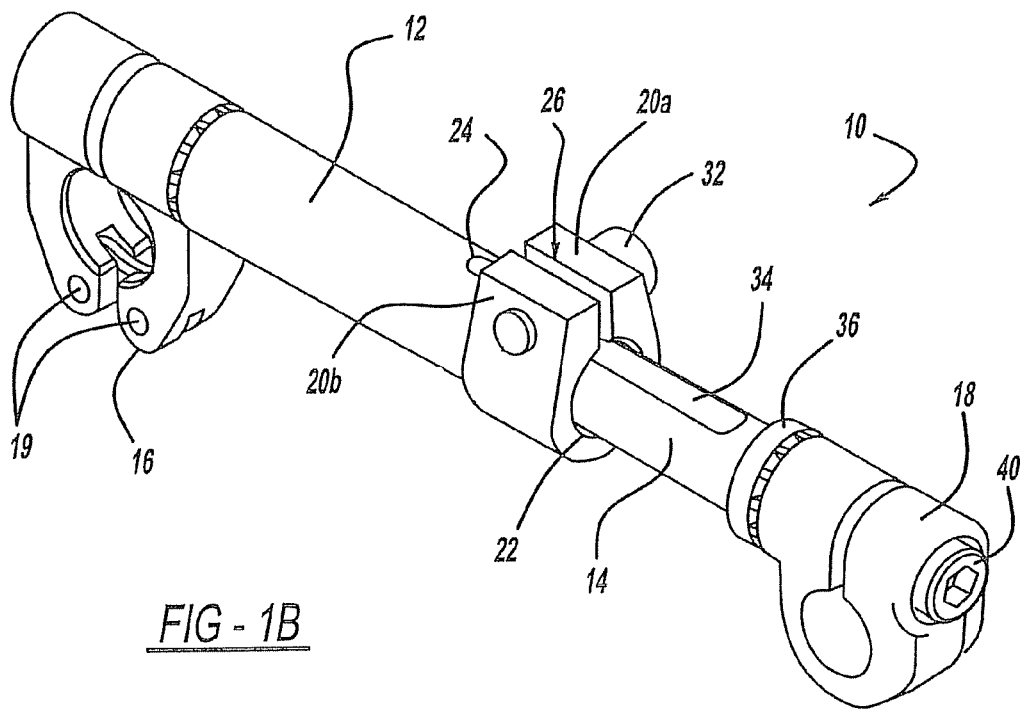
FIG. 1B is a perspective view of the telescoping clamp assembly of FIG. 1A, with the telescoping shaft in an extended position.
Figure 2A:
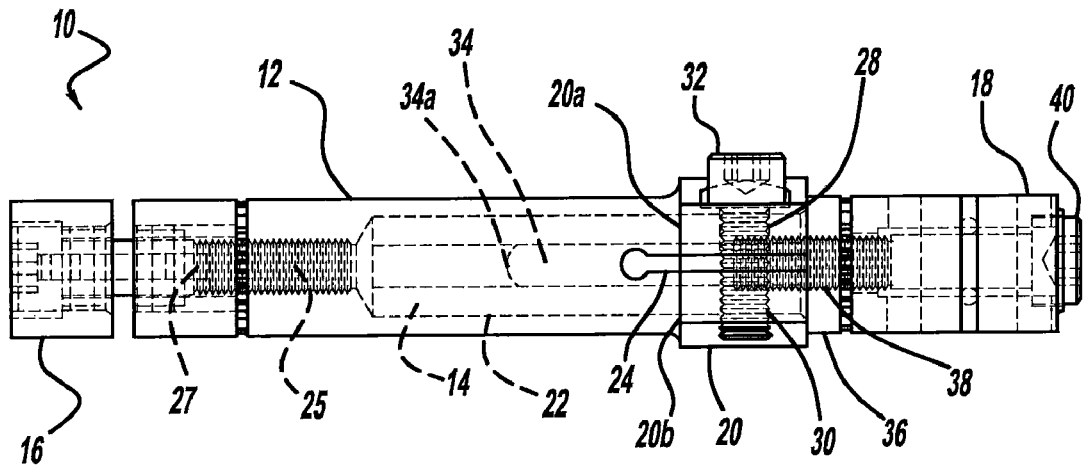
FIG. 2A is a top plan of the telescoping clamp assembly of FIG. 1A.
Figure 2B:
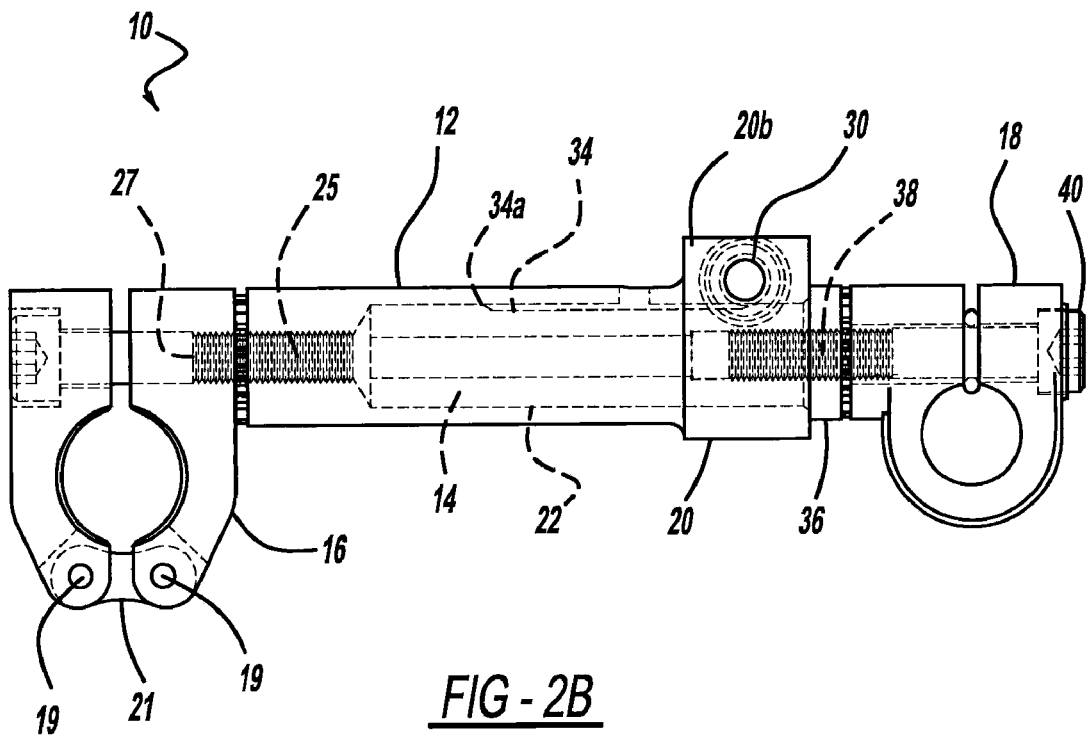
FIG. 2B is a side elevation of the telescoping clamp assembly of FIG. 1A.
Figure 3A:
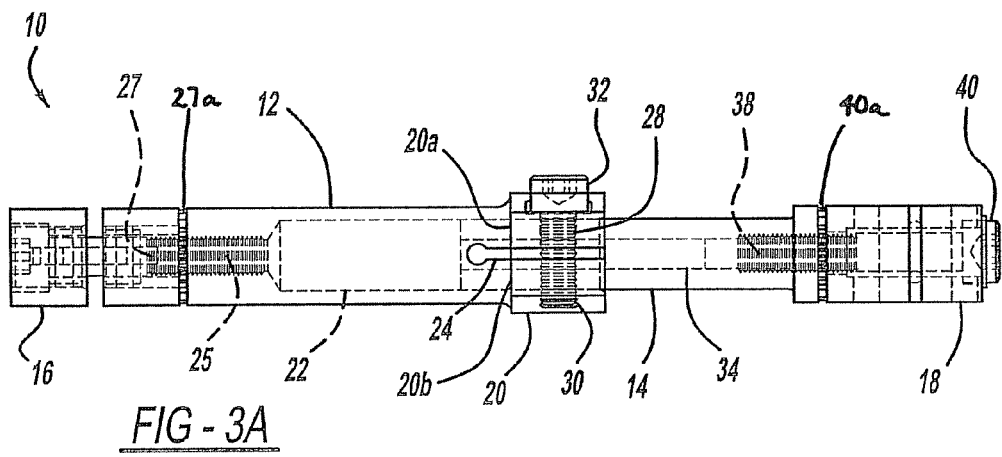
FIG. 3A is a top plan of the telescoping clamp assembly of FIG. 1B.
Figure 3B:
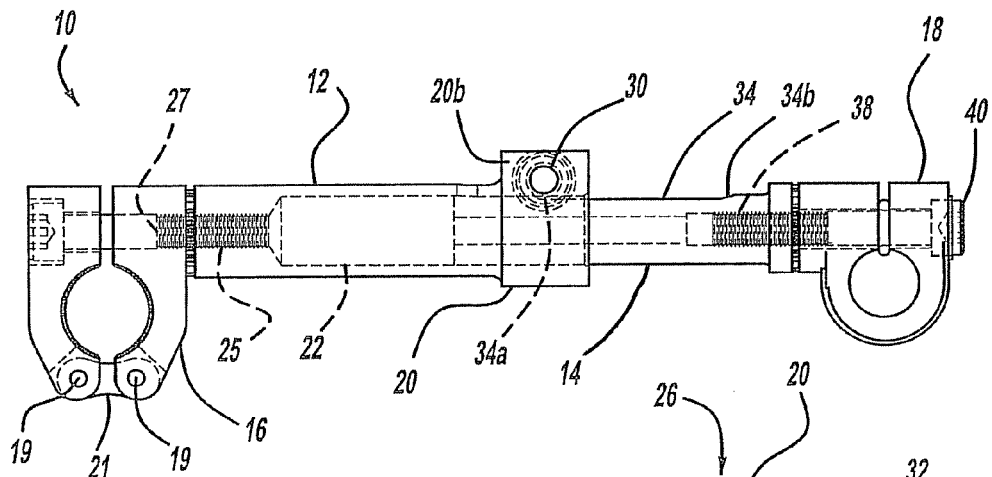
FIG. 3B is a side elevation of the telescoping clamp assembly of FIG. 1B.
Figure 4:
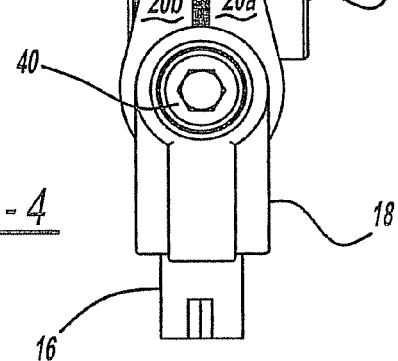
FIG. 4 is a front end elevation of the telescoping clamp assembly.

Referring now to the drawings and the illustrative embodiments depicted therein, a telescoping clamp assembly 10 for a material handling system includes an outer shaft or tube 12 that is telescopingly engaged with an inner or telescoping shaft 14 (FIG. 1B). Tube 12 and telescoping shaft 14 are adjustable relative to one another to adjust the length of telescoping clamp assembly 10 between a retracted length (FIGS. 1A, 2A, and 2B) and an extended length (FIGS. 1B, 3A, and 3B). When at a desired degree of extension, the telescoping shaft 14 may be secured relative to the tube 12 via tightening of a retaining element or clamping element or pin or bolt or fastener 32, as described below. The fastener 32 also functions to limit extension and/or extraction of the inner shaft from the outer shaft, as also discussed below.

Telescoping clamp assembly 10 is attachable or mountable to a support structure (such as a support arm or rod) of a material handling system at one end, and to a workpiece holder or gripping device or element (such as a gripper or vacuum cup assembly or the like) at the other end. For example, and as shown in FIGS. 1A-4, a 360 degree rotatable swivel arm clamp 16 for attaching to a support rod may be attached to one end of tube 12 while a 360 degree rotatable end clamp 18 for attaching to a gripping device or workpiece holder may be attached to an end of telescoping shaft 14 opposite swivel arm clamp 16. In the illustrated embodiment, rotatable end clamp 18 comprises a partial spherical ball clamp, while swivel arm clamp 16 comprises a straight bore clamp to receive and clamp onto a cylindrical support rod or arm or the like. Optionally, swivel arm clamp 16 may comprise a link end straight bore clamp (such as for a one inch diameter support rod or the like) for use on transfer press tooling, and may incorporate a pair of pivot pins 19 and a connecting link 21 (FIGS. 2A and 2B) that provide a dual pivot configuration and that apply a radial clamping force to the clamped component that may be greater than a clamping force of a single pivot configuration. However, other clamping devices or configurations may be implemented at the inner or outer shafts or tubes while remaining within the spirit and scope of the present disclosure.

Swivel arm clamp 16 is adjustably mounted to tube 12 via a fastener 27, such as a threaded bolt or the like, so that swivel arm clamp 16 may be rotated about a longitudinal axis of tube 12 when fastener 27 is loosened. Clamp 16 may be configured such that, when fastener 27 is removed, clamp 16 may open (via pivotal movement of the link and/or the outer portion of the clamp about the pivot pins) to allow the clamp to receive a support rod therein without having to slide the clamp over an end of the support rod, such that the clamping assembly 10 may be readily mounted to an existing support rod. Similar to clamp 16, rotatable end clamp 18 may also be adjustably mounted to telescoping shaft 14 via a fastener 40, such as a threaded bolt or the like, so that rotatable end clamp 18 may be rotated about a longitudinal axis of telescoping shaft 14 when fastener 40 is loosened.

The clamps 16, 18 thus may be loosened or adjusted relative to tube 12 and telescoping shaft 14, respectively, without affecting the clamping or retention or securement of the inner shaft relative to the outer shaft (via clamping collar 20), as discussed below. In the illustrated embodiment, the clamp assembly 10 includes a lock washer or star washer 27a disposed between the clamp 16 and the end of the tube 12 to assist in substantially locking or securing the clamp 16 relative to the tube 12 when fastener 27 is tightened. Likewise, clamp assembly 10 includes a lock washer or star washer 40a disposed between the clamp 18 and the end of the telescoping shaft 14 to assist in substantially locking or securing the clamp 18 relative to the shaft 14 when fastener 40 is tightened.

In the illustrated embodiment, the tube 12 is a cylindrical hollow member that defines a cylindrical bore 22 to receive the telescoping shaft 14. The bore 22 is open at one end of tube 12 for receiving the telescoping shaft 14 into tube 12. The open end of tube 12 includes a longitudinal slot 24 at least partially therealong, and incorporates a clamping device or collar 20 that is mounted to or integral with the end region of the tube 12. Bore 22 is sized and adapted to receive a portion of telescoping shaft 14 such that telescoping shaft 14 is substantially coaxial with and slidingly or telescopingly received in tube 12. The longitudinal slot 24 allows the diameter of the end of the tube 12 and the bore 22 to be selectively reduced by clamping collar 20 to substantially fix the position of telescoping shaft 14 within tube 12.

At the opposite end of the tube 12 (opposite from the end having clamping collar 20), tube 12 has a threaded bore 25 (which may be coaxial with bore 22) to receive threaded fastener 27. As discussed above, fastener 27 attaches swivel arm clamp 16 to the end of tube 12 and is adjustable such that fastener 27 may be loosened or tightened to loosen or tighten swivel arm clamp 16 without affecting the retention or tightness of shaft 14 in tube 12. Tube 12 may be made of any suitable material, such as, for example, steel or aluminum or aluminum alloy or any other material that is sufficiently strong and rigid to withstand the loads encountered during use.

In the illustrated embodiment, clamping collar 20 is integral with the tube 12 at its end, although the collar may be a separate collar attached at the end of the tube or elsewhere along the tube while remaining within the spirit and scope of the present disclosure. Clamping collar 20 defines a gap 26 (FIGS. 1A, 1B, and 4) that is substantially aligned with longitudinal slot 24 in tube 12. Clamping collar 20 includes portions or extensions or flanges 20a, 20b that extend radially outward from the tube 12 and define a first bore or aperture 28 and a second bore or aperture 30. Each aperture 28, 30 is oriented substantially perpendicular or lateral or transverse to a longitudinal axis of the tube 12. The first aperture 28 and the second aperture 30 receive the retaining element or fastener 32, such that fastener 32 bridges gap 26 when fastener 32 is installed in apertures 28, 30. First aperture 28 of flange 20a may be non-threaded or substantially smooth, while second aperture 30 of flange 20b may be threaded so as to engage complementary threads on retaining element or fastener 32. Fastener 32 is thus rotatable within first aperture 28 and second aperture 30 to tighten the fastener 32 to reduce the widths of gap 26 and longitudinal slot 24 in order to tighten tube 12 around telescoping shaft 14, and to thereby substantially fixedly hold telescoping shaft 14 within tube 12.

Optionally, and instead of or in addition to fastener 32 serving to both tighten tube 12 around telescoping shaft 14 and prevent shaft 14 from being separated from tube 12, a separate retaining pin or shaft (not shown) may be removably received in another lateral aperture (not shown) in clamping collar 20 or tube 12 to contact shaft 14 at end 34a of recess 34. Optionally, the retaining element or mechanism may include a female fastener, such as a nut having a threaded bore, or a clip or the like, that may be provided at a non-threaded second aperture such that a threaded fastener or bolt may be threadably engaged with the female fastener or otherwise received in or through the female fastener to tighten the tube around the telescoping shaft. Clamping collar 20 may be made of the same material as the tube, or may comprise any suitable material that is sufficiently strong and durable, and that is sufficiently resistant to thread-stripping during repeated engagement and tightening and loosening of the fastener within the threaded bore.

Telescoping shaft 14 includes a substantially cylindrical portion or section with an elongated recess or flattened portion or guide portion 34, such as a groove or planar portion formed or established longitudinally along a surface portion of shaft 14. A stop-flange or stop surface or locking surface 36 (such as a flange or surface that has a greater diameter than the diameter of the shaft to provide a larger surface area or radial extension or flange) may be formed at an end of telescoping shaft 14. The stop surface limits insertion of shaft 14 into bore 22 of tube 12 and/or provides an engaging surface for star washer 40a to engage and bite into when fastener 40 is tightened to clamp the star washer between the clamp 18 and the surface or flange 36 at the end of shaft 14. As discussed above, telescoping shaft 14 incorporates a threaded bore 38 at an end, with an opening at stop-flange 36 to receive fastener 40 from end clamp 18. Fastener 40 attaches end clamp 18 to the end of shaft 14 and is adjustable such that fastener 40 may be loosened or tightened to loosen or tighten swivel end clamp 18 without affecting the retention or tightness of shaft 14 in tube 12.

When assembled, flat portion or recess 34 of telescoping shaft 14 receives an outer portion of fastener 32 of collar 20 of tube 12, such that when fastener 32 is loosely installed in the apertures 28, 30 of clamping collar 20, telescoping shaft 14 is extendable until fastener 32 contacts the shaft 14 at an end 34a of recess 34, as best seen in FIG. 3B. Recess 34 may have any length or location along telescoping shaft 14 to limit the extension and/or extraction of shaft 14 relative to tube 12 for a given application. Optionally, an opposite end 34b of the recess 34 (FIG. 3B) may limit the degree of insertion of shaft 14 into tube 12, or the stop flange 36 may limit such insertion, while remaining within the spirit and scope of the present disclosure.

In the illustrated embodiment, telescoping shaft 14 is shown having a substantially circular cross section, although any cross section that may be received by bore 22 in tube 12 will suffice. Likewise, in the illustrated embodiment, bore 22 of tube 12 is shown having a circular cross section, although any cross section that may closely receive telescoping shaft 14 will suffice. For example, telescoping shaft 14 and bore 22 may have substantially corresponding or complementary cross sections or shapes, such as rectangular cross sections or other cross sectional shapes or forms, such that the telescoping shaft 14 is slidably received in bore 22 during adjustment of the telescoping clamp assembly 10.

When assembled, a portion of fastener 32, such as a threaded portion of the bolt, is at least partially within recess or recess 34, and in close proximity to, or in sliding contact with, recess 34 of telescoping shaft 14. The length of the clamping assembly thus may be readily adjusted via loosening and tightening of fastener 32 to loosen or reduce the clamping force of clamping collar 20. When telescoping shaft 14 is fully extended (FIGS. 1B, 3A, and 3B), such as when a user has loosened fastener 32 and gravity or another force has caused telescoping shaft 14 to extend, the threaded portion of fastener 32 contacts telescoping shaft 14 at end 34a of recess 34 such that shaft 14 is prevented from separating from tube 12. Thus, telescoping shaft 14 is substantially inseparable from tube 12 until fastener 32 is at least partially removed from clamping collar 20, or until fastener 32 is at least removed from the second aperture 30 and no longer bridges gap 26 of clamping collar 20.

Telescoping clamp assembly 10 is thus adjustable so that one or more material handling devices engage an object or support structure to move or hold or otherwise handle the object. Because of the engagement of fastener 32 with end 34a of recess 34, telescoping shaft 14 is retained within tube 12 during adjustment of the length of telescoping clamp assembly 10, and thus limits or substantially precludes unintentional disassembly or detachment of shaft 14 from tube 12.

Accordingly, telescoping clamp assembly 10 is assembled by first removing fastener 32 from clamping collar 20, if fastener 32 is installed therein, and inserting telescoping shaft 14 into bore 22 of tube 12, and rotating shaft 14 until first aperture 28 and second aperture 30 of clamping collar 20 are located generally at or are generally aligned with recess 34 of shaft 14. Fastener 32 is then inserted through first aperture 28, threaded into second aperture 30, and tightened until tube 12 substantially fixedly holds telescoping shaft 14 at the desired or appropriate degree of extension. Swivel arm clamp 16 and end clamp 18 may thus be independently installed, removed, loosened, or tightened with respective fasteners 27, 40 irrespective of whether or rot shaft 14 is tightly or loosely held in tube 12.

To adjust the length of telescoping clamp assembly 10, fastener 32 is loosened until telescoping shaft 14 is free to move longitudinally within tube 12, while fastener 32 remains within first aperture 28 and second aperture 30 of clamping collar 20 to prevent the telescoping shaft 14 from falling out of the tube 12. Telescoping shaft 14 is then extended or retracted within tube 12 to achieve the desired or appropriate or selected length of telescoping clamp assembly 10, and fastener 32 is tightened in clamping collar 20 to tighten tube 12 around shaft 14 until shaft 14 is substantially fixedly held within tube 12.

Figure 5A:
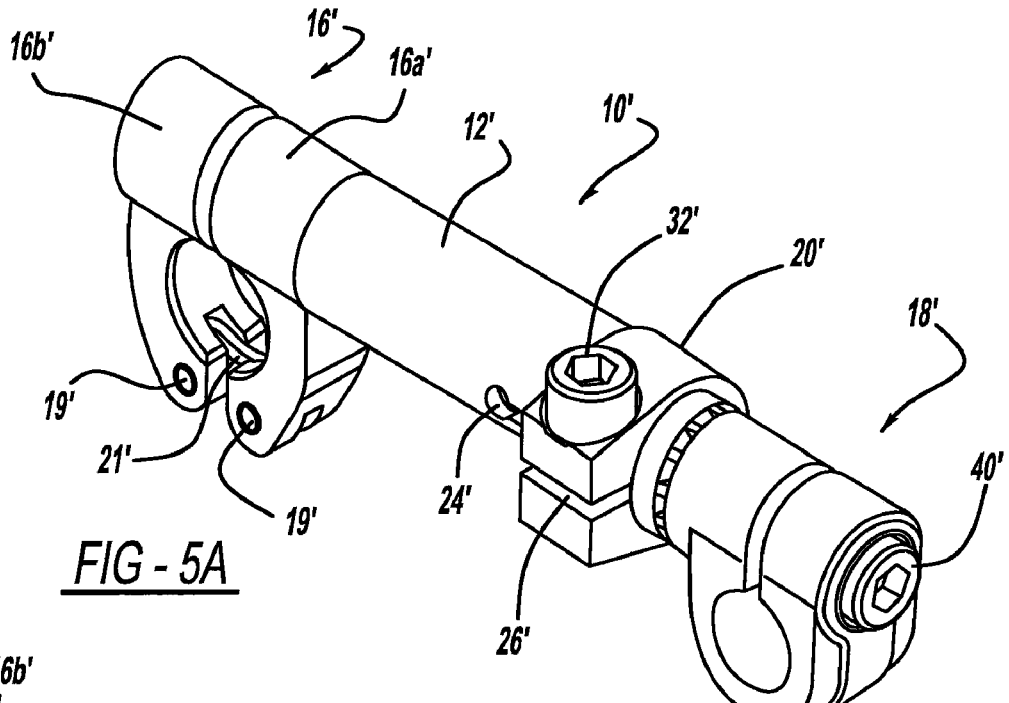
FIG. 5A is a perspective view of another telescoping clamp assembly with the telescoping shaft in a retracted position.
Figure 5B:
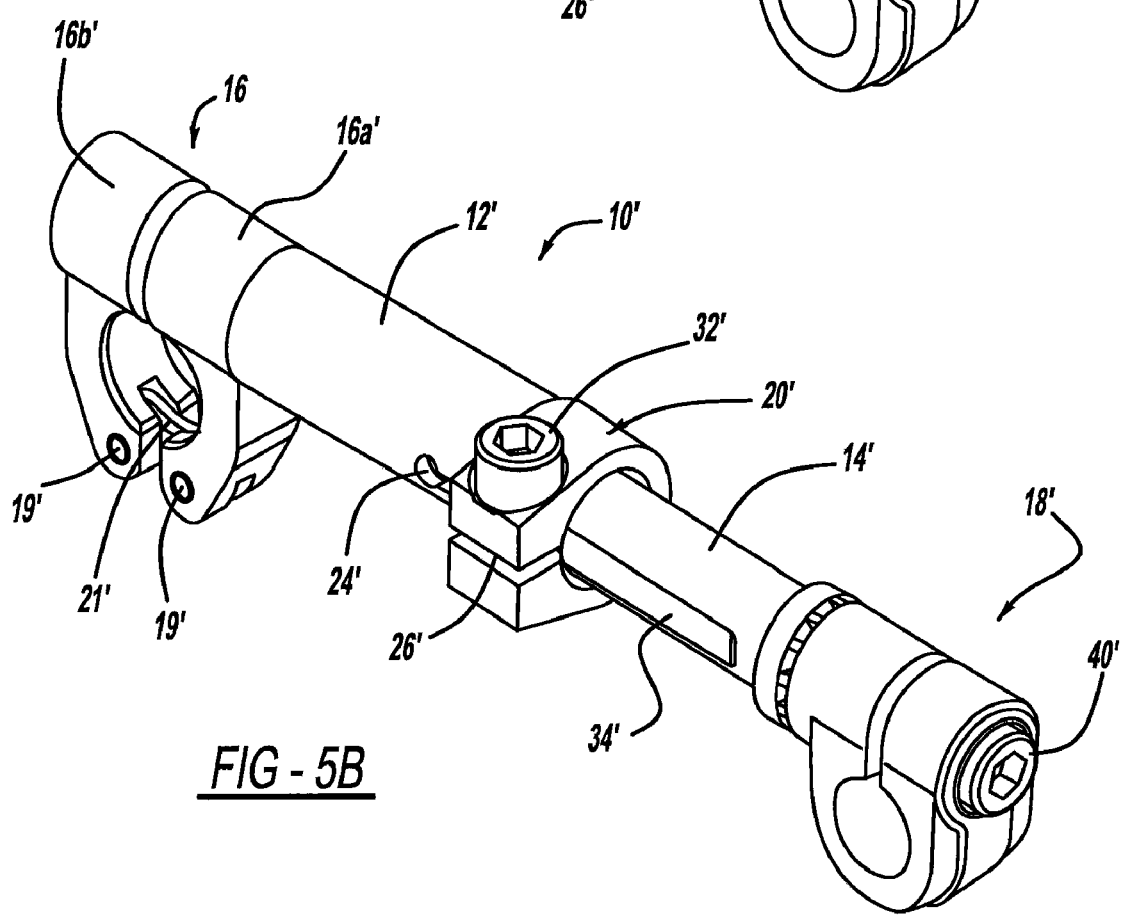
FIG. 5B is a perspective view of the telescoping clamp assembly of FIG. 5A, with the telescoping shaft in an extended position.

Although shown and described as having the clamp or clamps 16, 18 adjustably mounted at the end of the respective shaft 12, 14, one or both clamps may be fixedly mounted or secured at the end of the respective shaft while remaining within the spirit and scope of the present disclosure. For example, and with reference to FIGS. 5A and 5B, a swivel arm clamp 16' of a telescoping clamp assembly 10' may be fixedly secured or mounted at the end of an outer shaft or tube 12'. Optionally, a base or attaching or mounting portion 16a' of clamp 16' is press fit into a recess (not shown) at the end of outer shaft 12' to fixedly secure the clamp 16' relative to shaft 12'. An outer portion 16b' of clamp 16' may be pivoted (about the pivot link 21' and pivot pins 19') to receive and clamp around a support rod or the like of the material handling system. For example, the fastener (not shown in FIGS. 5A and 5B, but may be similar to fastener 27 of clamp assembly 10, discussed above) at clamp 16' may be loosened and at least partially removed to allow outer portion 16b' of clamp 16' to pivot to an open or rod receiving orientation, whereby the clamp assembly may be positioned at a support arm or rod and the outer portion 16b' may be pivoted around the rod toward a closed position (such as shown in FIGS. 5A and 5B).

The fastener may be tightened to clamp or tighten the clamp 16' about the support rod to secure the telescoping clamp assembly relative to the support arm or rod. The fastener may thread into a threaded bore of the outer shaft (such as in a similar manner as described above with respect to fastener 27) or the fastener may thread into a threaded bore of the mounting portion 16a' of the clamp 16' (which is fixedly secured or mounted to the outer shaft) or both, while remaining within the spirit and scope of the present disclosure. Thus, the clamp assembly may be readily mounted to a support arm or rod without disassembling the end clamp 16' from the shaft 12', since the base or mounting portion 16a' of clamp 16' remains affixed to the end of the shaft 12' even when the fastener is removed from the clamp assembly. The inner shaft 14' of telescoping clamp assembly 10' may have a workpiece holder clamp 18' (such as for clamping to or holding a workpiece holder or gripping device or element, such as a gripper or vacuum cup assembly or the like) at its outer end, and the workpiece holder clamp 18' may be adjustably mounted to the inner shaft 14' (such as via a threaded fastener 40' or the like, and such as described above with respect to clamp 18 of telescoping clamp assembly 10), or may be substantially fixedly attached to inner shaft 14', while remaining within the spirit and scope of the present disclosure.

Optionally, the clamping device or collar of the telescoping clamp assembly may be oriented at a different angle or orientation with respect to the fixed clamp, as compared to clamping collar 20 of telescoping clamp assembly 10, discussed above. For example, and as shown in FIGS. 5A and 5B, clamping collar 20' may be oriented so that fastener 32' is generally vertically oriented when clamp 16' is secured to a generally horizontal mounting structure or rod or arm. Such an orientation may ease tightening or loosening of fastener 32', and thus of clamping collar 20', depending on the clearances available in the particular application of the telescoping clamp assembly, such that the length of the telescoping clamp assembly may be readily adjusted after the clamp assembly is secured to the support structure of the material handling system.

Similar to fastener 32 of telescoping clamp assembly 10, fastener 32' of telescoping clamp assembly 10' functions to adjust the degree of clamping of the clamping collar 20' (via compression of the gap 26' and longitudinal slot 24' at the end region of the outer shaft 12') to establish the desired or appropriate length of the clamp assembly, and functions to engage the end (not shown in FIGS. 5A and 5B) of the longitudinal guide portion or recess 34' to limit extension and extraction of the inner shaft 14' from the outer shaft 12'. The telescoping clamp assembly may otherwise be substantially similar to the telescoping clamp assembly 10, discussed above, such that a detailed discussion of the telescoping clamp assemblies need not be repeated herein.

It will be appreciated by those skilled in the art that variations may be carried out without departing from the spirit and scope of the present disclosure. For example, a quick-clamping lever or other tightening feature may be used in place of a bolt to tighten or clamp the tube around the telescoping shaft and to contact or engage the shaft at an end of a guide portion or flattened portion or recess to limit or substantially preclude the shaft from separating from the tube. Optionally, a telescoping shaft may have a raised feature or guide portion instead of a flat portion or recess, whereby a retaining element may move along a portion of the shaft (which may be received in and be movable along a gap or slot in the tube) and may engage the raised portion to limit extension and/or extraction of the shaft from the tube. The bolt thus may be spaced slightly apart from, or may be in sliding contact with, the telescoping shaft, and the end or stop of the raised guide portion on the shaft may be contacted by the bolt so as to limit or substantially preclude the shaft from separating from the tube while the bolt is installed at the clamping collar, such as in a similar manner as described above.

Changes and modifications to the specifically described embodiments may be carried out without departing from the principles of the present disclosure, which is intended to be limited only by the scope of the appended claims, as interpreted according to the principles of patent law.

What is claimed is:

1. A telescoping clamp assembly for a material handling system, said telescoping clamp assembly comprising:
    an inner shaft having a longitudinal guide portion along an outer surface of said inner shaft;
    an outer shaft having a bore adapted to receive said inner shaft;
    a clamping device on said outer shaft, said clamping device including a clamping collar positioned about an outer periphery of said outer shaft, wherein said clamping collar is tighten to peripherally compress said outer shaft about said inner shaft for locking said inner shaft in position with respect to said outer shaft; and
    a retaining element, said retaining element being adjustable to adjust a degree of clamping of said clamping collar at said outer shaft, said retaining element positioned transverse to a longitudinal axis of said inner and outer shafts, said retaining element transversely engaging said longitudinal guide portion of said inner shaft to limit extension and/or extraction of said inner shaft from said outer shaft.

2. The telescoping clamp assembly of claim 1, wherein said inner shaft comprises a substantially cylindrical rod.

3. The telescoping clamp assembly of claim 2, wherein said longitudinal guide portion comprises a generally planar region of an outer cylindrical surface of said inner shaft.

4. The telescoping clamp assembly of claim 1, wherein said clamping device includes a lateral bore.

5. The telescoping clamp assembly of claim 4, wherein said lateral bore is at least partially threaded bore.

6. The telescoping clamp assembly of claim 1, wherein said retaining element comprises a threaded fastener.

7. The telescoping clamp assembly of claim 1 further comprising a first clamp at an end of said inner shaft and a second clamp at an end of said outer shaft.

8. The telescoping clamp assembly of claim 7, wherein said first clamp is coupled at said inner shaft by a first threaded fastener, and said second clamp is coupled at said outer shaft by a second threaded fastener.

9. The telescoping clamp assembly of claim 7, wherein at least one of said first and second clamps is fixedly coupled to the respective one of said inner shaft and said outer shaft.

10. The telescoping clamp assembly of claim 7, wherein said first clamp and said second clamp are adjustable irrespective of said retaining element and said clamping device.

11. The telescoping clamp assembly of any preceding claim, wherein said clamping device is unitarily formed with said outer shaft.

12. A telescoping clamp assembly for a material handling system, said telescoping clamp assembly comprising:
    an inner shaft having a longitudinal guide portion along an outer surface of said inner shaft;
    an outer shaft having a bore adapted to receive said inner shaft, said inner and outer shafts defining a longitudinal axis;
    a clamping device at said outer shaft, wherein said clamping device is configured to tighten said outer shaft about said inner shaft;
    a retaining element, said retaining element being adjustable to adjust a degree of clamping of said clamping collar at said outer shaft, said retaining element engaging said longitudinal guide portion of said inner shaft to limit extension and/or extraction of said inner shaft from said outer shaft; and
    said inner and outer shafts including arm clamp receiving bores positioned along said longitudinal axis; and
    a pair of arm clamps, each arm clamp adjustably coupled with a respective arm clamp bore so that said arm clamp can move axially along said longitudinal axis without adjustment of said inner shaft with respect to said outer shaft.

\* \* \* \* \*

UNITED STATES PATENT AND TRADEMARK OFFICE
CERTIFICATE OF CORRECTION

PATENT NO.        : 7,891,619 B2
APPLICATION NO.   : 12/117223
DATED             : February 22, 2011
INVENTOR(S)       : Maurice Perlman Page 1 of 1

It is certified that error appears in the above-identified patent and that said Letters Patent is hereby corrected as shown below:

Column 6
Line 17 "rot" should be --not--

Column 8
Line 14, claim 1, after "shaft" insert --; and--

Between lines 14 and 15, claim 1, insert as a new paragraph the following --at least one first clamp at an end of the inner shaft or an end of the outer shaft--

Line 27, claim 7, after "comprising" delete "a first clamp at an end of said inner shaft and"

Line 28, claim 7, after "of" delete "said" and insert --the other of the--

Line 28, claim 7, after "shaft" insert --or the inner shaft--

Signed and Sealed this
Nineteenth Day of July, 2011

David J. Kappos
*Director of the United States Patent and Trademark Office*